United States Patent [19]

Sobotta

[11] 3,847,473

[45] Nov. 12, 1974

[54] SLIDE PROJECTOR WITH VARIABLE TIMING MEANS FOR SLIDE CHANGE

[75] Inventor: Reinhard Sobotta, Mascherode, Germany

[73] Assignee: Rollei-Werke Franke & Heidecke, Braunschweig, Germany

[22] Filed: Aug. 1, 1972

[21] Appl. No.: 276,962

[30] Foreign Application Priority Data
Aug. 6, 1971   Germany............................ 2139406

[52] U.S. Cl................. 353/114, 353/120, 353/122
[51] Int. Cl. ............................................ G03b 23/02
[58] Field of Search .......................... 353/103–118, 353/25, 27, 120, 122, 19; 40/36, 79

[56] References Cited
UNITED STATES PATENTS

| 2,933,979 | 4/1960 | Lacoe | 353/113 |
| 3,074,314 | 1/1963 | Wiklund | 353/116 |
| 3,296,925 | 1/1967 | Yamamoto | 353/19 |
| 3,334,544 | 8/1967 | Zillmer | 353/92 |

Primary Examiner—Louis R. Prince
Assistant Examiner—A. J. Mirabito
Attorney, Agent, or Firm—Stonebraker & Shepard

[57] ABSTRACT

A photographic slide projector is provided with electrically driven means for changing slides. Each slide is provided with a projection or protuberance on one edge of the slide, in a variable position depending on the length of time it is desired to have this particular slide held in viewing position. The projector mechanism includes a feeler which is displaced by the projection on the slide when the slide is shifted from the slide magazine into slide viewing position within the projector, the extent of displacement of the feeler depending upon the position of the projection on the slide. The extent of displacement of the feeler, in turn, determines the setting of a variable resistor which controls the operation of a timer which controls the length of time that the slide is held in viewing position, before the slide change drive operates to move the slide back into the magazine and to shift the next slide from the magazine into viewing position.

4 Claims, 1 Drawing Figure

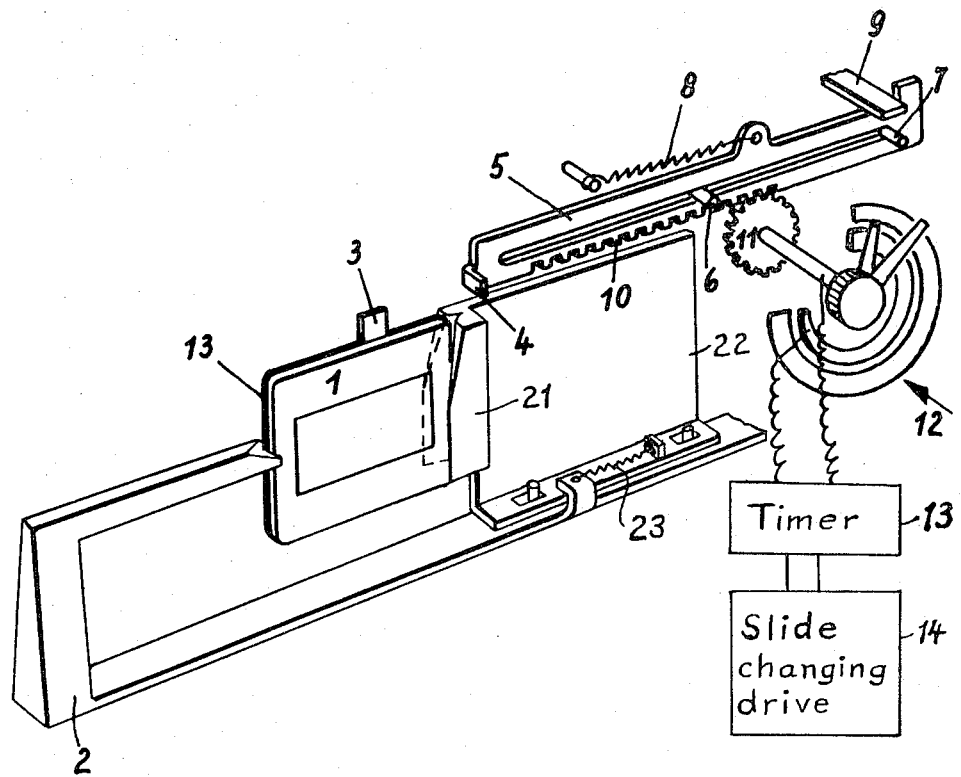

SLIDE PROJECTOR WITH VARIABLE TIMING MEANS FOR SLIDE CHANGE

BACKGROUND OF THE INVENTION

The invention relates to photographic projectors for projecting photographic slides onto a viewing screen, and more particularly to such a projector in which successive slides are moved into and out of viewing position by an electric drive. The invention deals particularly with mechanism for determining the length of time that the slide will be held in viewing position, before the drive mechanism returns it to the slide magazine and shifts another slide from the magazine to viewing position.

It is known in the art to provide projectors with so-called timers which are switched on by a slide changing impulse and then, after a selectable retardation time, the timer supplies the next change impulse to move the timer back to its basic or starting position and to initiate the changing cycle for shifting the slide back from viewing position into the magazine and shifting a different slide from the magazine into viewing position. With such projectors, according to known arrangements, the slide showing or viewing time can be adjusted within wide limits, but nevertheless it remains the same for all of the slides of the group. The necessary or desirable time of observation or projection of slides often differs considerably from one slide to another, but the known projectors of the kind just mentioned are not capable of presetting to project different slides for different lengths of time.

In another know arrangement, a slide projector is operatively connected to a tape recorder, and the tape recorder is programed to produce an impulse to initiate each cycle of operation of the slide changer. With such an arrangement, it can be insured that the slides are changed in accordance with the comments of the operator or with the recorded explanatory text. While this arrangement has some advantages, there are two disadvantages, in that it requires the use of a tape recorder in addition to a projector, and also it requires that the slides always be projected in the same order, which is the order for which the tape recorder has been programed. At times, or on special occasions, the operator may wish to arrange some of the slides in a different order, or he may wish to omit some slides or insert a few extra slides at an intermediate point in the program, and this cannot be done without revising the tape of the tape recorder.

In any event, it is often desired to use a magazine type film projector without a tape recorder, and yet to have the slides projected automatically but with different projection times for different individual slides. This has not been feasible or readily possible with the slide projectors of the prior art.

The previously known slide projectors for projecting slides from a magazine, when operated by hand, also suffer from the drawback that the operator is never certain whether he will be able to adhere to a certain time period allowed for his commentary. If he manipulates the changing mechanism by hand and thus individually determines the desirable projection time for each individual slide, he may find that he is running out of time toward the end of the showing, so that he may have to show too many slides per unit of time, or else may have to cut short his talk.

It is an object of the present invention to obviate all of the above mentioned difficulties and drawbacks, and to provide a magazine slide projector so designed that each individual slide carries its own means for determining how long the slide will remain in projection position, before commencement of the next cycle of slide changing operation. Thus, since each slide has its own means for determining how long it will be projected, the length of time for showing the entire program can be accurately predetermined in advance, with no danger or running out of time, and the slide changing cycles will follow each other in proper order and in proper time sequence, showing some slides for longer times and some for shorter times as may seem advisable to the person setting up the program, and all of this will occur automatically once the projector has been set into operation, even if the operator moves away from the projector. Moreover, this will occur even if the operator decides, perhaps at the last minute, to change the order in which some of the slides are shown, or to omit some slides, or to add others, although of course the withdrawal of some slides and addition of slides would alter the total time for completing the program, but would not alter the previously selected time for viewing each individual slide.

Another object is the provision of means of a relatively simple, inexpensive, and sturdy character, for accomplishing the above mentioned object.

Still another object is the provision of such means so designed that the time selected for projection of each individual slide may be subsequently changed (lengthened or shortened) if required.

These objects are achieved, according to the present invention, by means of a scanning element for protuberances or projections associated with the individual slides, for the automatic setting of the individual projection time, the scanning element interacting with a timer. The scanning element may conveniently comprise a slider coupled by a rack and pinion coupling with a setting resistor of a switch which controls the operating cycle, or else the scanning element itself may constitute the indicator of a switch mounted on the same shaft as the setting resistor.

To enable the individual projection times of the respective slides to be modified later, the protuberances or projections associated with the respective slides are affixed to the latter by clips, staples, or adhesive strips. To enable them to be affixed to the slides more firmly, the projections are preferably provided on what may be called "switching cards," which are of the same size as a slide but are cut out centrally so they do not obscure the picture area of the slide.

To avoid the necessity of excessive dimensions for the contours of the slide frame (that is, the mount) the broad side of the latter bears the protuberances in the form of lugs, in a preferred embodiment of the invention. To insure that the projection time can be subsequently modified with these protuberances or lugs on the slide frames, a further characteristic of the invention, in its preferred form, resides in the fact that the said protuberances can be detached or extracted.

The particular advantages offered by the present invention include the fact that the individual projection time of each separate slide is automatically set by the slide magazine projector. The operator can thus leave the projector without causing boredom to the viewers by leaving certain slides showing for an excessive time.

He is also able to give an accurate indication of the probable time at which the lecture will terminate. He can thus be certain that he will neither have to leave anything out, nor have any unnecessary time left on his hands.

BRIEF DESCRIPTION OF THE DRAWING

The single FIGURE of the drawing is a schematic perspective view of the main parts of the slide changer of a projector, according to a preferred embodiment of the invention, showing a slide in the magazine position, with no slide in the viewing position in the projection gate.

DESCRIPTION OF THE PREFERRED EMBODIMENT

The slide projector in general, except for the timing control, may be of conventional kind, and therefore is not shown. As usual, the projector has a light source, a projection gate or film gate, a projection lens for projecting an image of a slide in the projection gate onto a suitable viewing screen, and a conventional slide transfer mechanism or changing mechanism, to move slides one at a time from a magazine containing several such slides, into the projection gate for an interval of time, and then, at the end of such interval, to move the slide back from the projection gate to the magazine and to move the next slide from the magazine into the projection gate. All of this is well known in the art.

Various forms of motor driven slide changing mechanism are known in the art, and can be used with the present invention. The drawing shows one known form of slide changer which is convenient for purposes of the present invention, but as above indicated, various other forms can be used. The picture slide indicated at 1 (comprising a picture or diapositive held in a rectangular frame usually called a mount) is engaged between a terminal arm on a horizontally movable slider member 2, which grips the outer vertical edge of the picture slide 1, and an abutment member 21 which engages against the opposite vertical edge of the picture slide 1. This member 21 is on a plate 22 which is slidably mounted on the lower horizontal part of the change slider 2 and which is urged toward the picture slide by a spring 23, in known manner. With the picture slide thus gripped and held frictionally between the members 2 and 21, the entire slider mechanism comprising the members 2, 21, 22, and 23 is bodily moved laterally by the conventional motor driven slide changing drive, in a rightward direction from the position shown in the drawing, to move the picture slide 1 from the illustrated position (in the magazine) to a position in the projection gate or film gate, located on the optical axis of the source of light and the projection lens. At the end of the desired projection interval or viewing interval, the slider mechanism moves leftwardly, carrying the picture slide out from the optical axis to the magazine, and the magazine is advanced one step to bring the next slide into alignment with the transferring or changing mechanism, which then moves the next slide into the projection gate at the optical axis.

As already indicated, slide changing mechanism are known in which the change is automatically accomplished after the slide has been held in the projection position for a predetermined time interval. When this time interval has been preset at the beginning of a particular lecture or showing of pictures, it remains the same for each slide in the magazine, there being no provision for projecting different slides for different lengths of time, unless a manual adjustment is made during the course of the lecture or showing. With the present invention, however, each picture slide is associated with its own individual control means or signal means for determining the length of time that this particular slide is to remain in projection position, and thus one picture slide can be projected and viewed for a length of time different from the viewing time of the slide ahead of it or the slide behind it in the magazine, all without any further attention by the operator and without having to use a control tape of a tape recorder.

This is accomplished, according to the invention, by providing each picture slide 1 with an associated protuberance or projection 3, which projects upwardly beyond the upper edge of the slide mount as seen in the drawing. As the picture slide is moved rightwardly toward the projection gate at the optical axis, the protuberance 3 strikes a bent lug 4 on a slider member 5 which is guided for horizontal movement by the stationary guide pins 6 and 7 in the projector. A light spring 8 tends to move the slider 5 leftwardly until a portion thereof comes against a stationary stop 9.

The lower edge of the slider 5 is in the form of a rack with gear teeth 10 which mesh with the teeth of a pinion 11 fixed to the shaft of a setting resistor 12. As the slider 5 is moved rightwardly (against the restoring action of the light spring 8) by pressure of the protuberance 3 on the picture slide, it will turn the pinion 11 and thus turn the adjusting arm of the setting resistor 12, to vary the electrical rsistance thereof. The resistor will be turned to a greater or lesser extent, depending on the position of the protuberance or lug 3 along the top edge of the picture slide 1. If the protuberance 3 is closer to the right hand end of the slide (when viewed as in the drawing) the slider 5 will be moved to a greater extent as the picture slide is shifted from the magazine to the projection gate in the optical axis, and the adjusting arm of the setting resistor will be turned to a greater extent. If the protuberance 3 is further to the left, with respect to the edge of the picture slide 1, the shifting of the slide from the magazine to the projection gate will cause less motion of the slider 5, and the adjusting arm of the setting resistor will be turned to a lesser extent.

The resistor 12 is operatively connected in the control circuit of a conventional electric timer 13 which controls the time cycle of the conventional slide changing drive 14 which controls the movements of the changing member 2.

The operation will be clear from what has been said above, but may be briefly summarized as follows: when the changing slider 2 is moved rightwardly from the position shown in the drawing, either by the motor driven changing mechanism or by hand, the picture slide 1 will be shifted from the magazine position to a position in the projection gate at the optical axis. During this movement, the protuberance or lug 3 associated with this individual slide, will engage the lug 4 on the setting slider 5, and this will set the variable resistor 12 to a position depending upon the position of the lug 3 on the edge of the picture slide 1. This will set the timer 13 to the desired time interval, so that after the picture has remained in projection position for the preselected interval, the slide changing drive 14 will operate to shift the picture back from the optical axis to the magazine, and to step the magazine forward (or backward, as the case may be) through one step, to bring the next picture slide into alignment with the shifting arm 2. The particular resistance value to which the resistor 12 has been set, during the travel of the picture slide 1 into the projection position, will control the timer interval in a conventional manner well known in the art, usually through an RC combination (resistance-capacitor combination) well known in the art.

The protuberance or lug or projection 3 on the picture slide may be formed directly on the mount or frame of the picture itself, or may be a separate element mounted on the picture mount by adhesive, or by a staple, or by other detachable means so that its position may be varied when the operator changes his mind as to the viewing time or projection time which would be appropriate for this particular picture. Preferably, however, the projection or lug 3 is formed on a separate member 13 of cardboard or of thin metal or plastic material, which may conveniently be called a "switching card," and which has (except for the protuberance 3) the same external outline or dimensions as the mount of the picture slide 1, the central part being cut away so as not to obscure the passage of light through the picture area of the slide. It is contemplated that the user will have a supply of such switching cards with the lugs thereof at different locations along the edge of the switching card, and when he is setting up a program, he will select an appropriate one of the switching cards from his supply, and place it against one face of the picture slide which is to be controlled thereby. The switching card may in some cases simply lie next to the slide without being physically attached thereto, but the picture slide plus the switching card will together be sufficiently thin so that they can be moved as a unit by the slide changing mechanism. In other cases, the switching card may be physically connected to the picture slide by adhesive, preferably of such a nature that the switching card can be readily peeled off of the picture slide whenever desired, to be replaced by a different switching card with the timing lug at a different location along the edge of the switching card.

The supply of switching cards may include some cards with the timing protuberances or lugs at a central point in the middle of the length of the edge of the card, and other cards with lugs at various points along the edge, to give various projection time intervals such as, for example, five seconds, ten seconds, fifteen seconds, twenty seconds, or more. Switching cards can be so formed that either face thereof may be placed against the face of the picture slide, thus reducing the number of different kinds of switching cards to be supplied, since a card with an off-center control lug or protuberance will control one time interval if one face of the switching card is placed against the picture slide, and will control a different time interval if the opposite face of the switching card is placed against the picture slide.

The term "picture slide assembly" is intended as a broad generic term, including what is commonly called a picture slide (the picture itself plus its mount of cardboard or plastic) together with its protuberance or actuating element which cooperates with the feeler or scanning element to set the timer to the proper time. Thus the term picture slide assembly includes the protuberance or other actuating means for the feeler, regardless of whether such actuating means is directly on the slide mount, as a permanent part thereof or as a clip or element frictionally or adhesively held on the mount, or whether the protuberance is on a separate member associated with the slide, such as the above mentioned switching card or switching element.

What is claimed is:

1. The combination with a picture slide projector having means for automatically changing slides, of a picture slide assembly having means cooperating with said projector to determine the time interval that the slide assembly remains in projection position in the projector;

said projector including a slide changing drive, a timer for controlling the length of the time interval during which said drive leaves each slide in projection position before changing to the next slide, and a movable feeler member effective upon movement to adjust said timer to a different time interval;

said picture slide assembly including a conventional slide mount in which a picture slide is held, and a switching element separate from and lying against one face of said slide mount, said switching element having on one edge a protuberance projecting outwardly beyond the corresponding edge of said mount, said element otherwise having substantially the same outline as said mount, said protuberance being in position to engage and move said feeler element of said projector while said picture slide assembly is being moved into projection position in said projector by operation of said means for changing slides.

2. The invention defined in claim 1 wherein said switching element is detachably secured to said slide mount.

3. The invention defined in claim 1, wherein said switching element is adhesively secured to said slide mount.

4. The invention defined in claim 3, wherein the adhesive securing said switching element to said slide mount is of a character enabling said element to be peeled off of the slide mount when desired.

* * * * *